United States Patent [19]

Miller et al.

[11] Patent Number: 4,693,730
[45] Date of Patent: Sep. 15, 1987

[54] PRESSURE SWING ADSORPTION PRODUCT PURITY CONTROL METHOD AND APPARATUS

[75] Inventors: Geoffrey Q. Miller, Spring Valley; Robert L. Gray, Jr., Mahopac, both of N.Y.

[73] Assignee: Union Carbide Corporation, Danbury, Conn.

[21] Appl. No.: 889,795

[22] Filed: Jul. 24, 1986

[51] Int. Cl.⁴ .............................................. B01D 53/04
[52] U.S. Cl. .......................................... 55/18; 55/26; 55/62; 55/68; 55/160; 55/179; 55/270; 55/387; 55/389
[58] Field of Search ................... 55/18, 20, 21, 25, 26, 55/58, 62, 68, 74, 75, 160–163, 179, 270, 387, 389

[56] References Cited

U.S. PATENT DOCUMENTS

| | | | |
|---|---|---|---|
| 3,176,444 | 4/1965 | Kiyonaga | 55/26 |
| 3,430,418 | 3/1969 | Wagner | 55/25 |
| 3,703,068 | 11/1972 | Wagner | 55/21 |
| 3,986,849 | 10/1976 | Fuderer et al. | 55/25 |
| 4,021,211 | 5/1977 | Turek et al. | 55/18 |
| 4,140,495 | 2/1979 | Pietruszewski | 55/21 |
| 4,197,095 | 4/1980 | White, Jr. et al. | 55/20 |
| 4,299,595 | 11/1981 | Benkmann et al. | 55/21 |
| 4,315,759 | 2/1982 | Benkmann | 55/387 X |
| 4,323,370 | 4/1982 | Leitgeb | 55/18 |

*Primary Examiner*—Robert H. Spitzer
*Attorney, Agent, or Firm*—M. N. Reinisch

[57] ABSTRACT

The present invention provides a method and apparatus for automatically controlling product purity in a pressure swing adsorption process without risking unacceptable impurity breakthrough as the feedstock changes, yet providing rapid response and high stability. The process comprises sensing a characteristic of the effluent from cocurrent depressurization, and taking corrective action responsive thereto. Any action can be taken which is effective to vary the impurity concentration in the product gas in the direction necessary to obtain desired product purity. Among the suitable corrective actions are the following: (1) adjusting the adsorption step time to control the impurity loading of each adsorbent bed; (2) adjusting the cocurrent depressurization termination pressure to control the impurity breakthrough at the product end of each adsorbent bed; and/or (3) adjusting the amount of purging gas received by each adsorbent bed to control the extent of regeneration.

20 Claims, 4 Drawing Figures

| STEP | 1 | 2 | 3 | 4 | 5 | 6 | 7 | 8 | 9 | 10 | 11 | 12 |
|---|---|---|---|---|---|---|---|---|---|---|---|---|
| VESSEL | | | | | | | | | | | | |
| A | ADSORPTION ◁ ◁ | | | EQ H ◁ | ▷ PROVIDE PURGE ◁ | | BLOW DOWN ▷ | | PURGE ▷ ◁ | ▷ EQ | PRODUCT REPRESSURIZATION ◁ | |
| B | BLOW DOWN ▷ | | | ▷ EQ | PRODUCT REPRESSURIZATION ▷ | | | ADSORPTION ◁ | | ◁ EQ | H PROVIDE PURGE ◁ | |
| C | ◁ EQ | H PROVIDE PURGE ◁ | | BLOW DOWN ▷ | PURGE ▷ ▷ | | ▷ EQ | PRODUCT REPRESSURIZATION ◁ | | ADSORPTION ◁ | | |
| D | ▷ EQ | PRODUCT REPRESSURIZATION ▷ | | ADSORPTION ◁ ◁ | | | ◁ EQ | H PROVIDE PURGE ◁ | | BLOW DOWN ▷ | PURGE ▷ ▷ | |

TIME 0        225        450        675        900
(SECONDS)

EQ = PRESSURE EQUALIZATION   △ = FLOW UP THE ADSORBER
H = HOLD*                    ▽ = FLOW DOWN THE ADSORBER

*HOLD IS INITIALLY SET FOR 0 SECONDS

4,693,730

PRESSURE SWING ADSORPTION PRODUCT PURITY CONTROL METHOD AND APPARATUS

BACKGROUND OF THE INVENTION

The present invention relates to control of product purity in a pressure swing adsorption system; and, more particularly, to a method and apparatus for automatically controlling product purity without risking unacceptable impurity breakthrough as the feedstock changes, yet providing rapid response and high stability.

Pressure swing adsorption (PSA) provides an efficient and economical means for separating a multicomponent gas stream containing at least two gases having different adsorption characteristics. The more-strongly adsorbable gas can be an impurity which is removed from the less-strongly adsorbable gas which is taken off as product; or, the more-strongly adsorbable gas can be the desired product, which is separated from the less-strongly adsorbable gas. For example, it may be desired to remove carbon monoxide and light hydrocarbons from a hydrogen-containing feed stream to produce a purified (99+%) hydrogen stream for a hydrocracking or other catalytic process where these impurities could adversely affect the catalyst or the reaction. On the other hand, it may be desired to recover more-strongly adsorbable gases, such as ethylene, from a feed to produce an ethylene-rich product.

In pressure swing adsorption, a multicomponent gas is typically fed to one of a plurality of adsorption beds at an elevated pressure effective to adsorb at least one component, while at least one other component passes through. At a defined time, feed to the adsorber is terminated and the bed is depressurized by one or more cocurrent depressurization steps wherein pressure is reduced to a defined level which permits the separated, less-strongly adsorbed component or components remaining in the bed to be drawn off without significant concentration of the more-strongly adsorbed components. Then, the bed is depressurized by a countercurrent depressurization step wherein the pressure on the bed is further reduced by withdrawing desorbed gas countercurrently to the direction of feed. In multi-bed systems there are typically additional steps, and those noted above may be done in stages. U.S. Pat. Nos. 3,176,444 to Kiyonaga, 3,986,849 to Fuderer et al, and 3,430,418 to Wagner, among others, describe multi-bed, adiabatic pressure swing adsorption systems employing both cocurrent and countercurrent depressurization, and the disclosures of these patents are incorporated by reference in their entireties.

It is known that controlling product impurity level, e.g., in the less-strongly adsorbed component, to the maximum allowable level results in the highest system efficiency. It is also known that the primary means for controlling product impurity level is to adjust the time each adsorber spends in the adsorption step. If the product impurity level is too high, the adsorption step is shortened, and vice versa. However, when processing feedstocks of a variable nature, e.g., a feedstock comprised of several different streams which may not all be present at all times, it is difficult to control the product purity concentration without unacceptable impurity breakthrough as the feedstock changes.

In conventional systems, the operator monitors the product impurity level and manually adjusts the adsorption step time. This manual process can be automated through a feedback control system. In such a system, the product impurity level would be sensed, and a controller would adjust the adsorption step time depending on the difference between the actual and desired impurity level. Such a system, however, suffers from the usual disadvantage of feedback control; that is, corrective action can only be taken after the undesired event (too high or low impurity level in the product) has occurred.

A feedforward control system could be used alone or in conjunction with the above feedback control system. The feedforward system would be much more complex. The feed composition and flow would have to be measured on-line and the measurements would have to be input into a process model in order to determine the magnitude of the corrective action. The feedforward system has several disadvantages, including the following: (1) feedforward control systems are inherently less stable than feedback control systems; (2) a system which can accurately analyze the concentrations of the components in a multi-component system would be extremely complex and expensive; and (3) an overly-simple and inaccurate process model would have to be used due to practical process control system limitations.

There remains a present need for a method and apparatus for automatically controlling the quality of product from a pressure swing adsorption system which could maximize system efficiency not only for feeds of constant composition but also for feeds which vary in composition and/or flow rate, pressure levels, or temperature, as well as systems operating with other variable process parameters.

SUMMARY OF THE INVENTION

The present invention provides such a method and apparatus for controlling product purity from a pressure swing adsorption process including a cocurrent depressurization step. The process comprises: sensing a characteristic of the effluent from said cocurrent depressurization, and taking corrective action responsive to the sensed characteristic, said action being effective to vary the impurity concentration in the product gas in the direction necessary to obtain desired product purity. The apparatus comprises: means for sensing said characteristic, and means for taking said corrective action.

The corrective actions taken to force the actual impurity level in the cocurrent depressurization gas to the target level include, but are not limited to, the following: (1) adjusting the adsorption step time or other variable to control the impurity loading of each adsorbent bed; (2) adjusting the cocurrent depressurization termination pressure to control the impurity breakthrough at the product end of each adsorbent bed; and/or (3) adjusting the amount of purging gas received by each adsorbent bed to control the extent of regeneration.

After a target impurity level or other physical characteristic in the cocurrent depressurization gas is reached within a defined tolerance, the product gas impurity level is preferably measured. If the product gas impurity level is not at the desired value, the difference between the actual and desired level is used to calculate a new target value for the impurity level in the cocurrent depressurization gas. The larger the difference, the larger the change in the target value.

This type of cascade control eliminates the need for a priori determination of the target value, and accommodates changes in the correct ratio of the impurity levels in the cocurrent depressurization gas and product gas resulting from changes in feed composition.

The control system of the invention has the advantages of both the feedback and feedforward control systems, without the disadvantages. An unacceptable impurity breakthrough will always occur in the cocurrent depressurization gas before it occurs in the product gas, and corrective action is taken according to the invention before the undesired event has occurred. The control system does not depend upon accurate feed component analyses and process models. It is also more stable than a feedforward system.

The invention enables automatic adjustment of internal operating parameters of a PSA unit to maintain product purity under changing operating conditions. A physical characteristic of the cocurrent depressurization effluent, such as the impurity concentration near the end of the cocurrent depressurization step, is measured, and controlled through cycle time and/or other adjustments to a target value. The target value is determined such that the desired product impurity level is achieved.

BRIEF DESCRIPTION OF THE DRAWINGS

The invention will be better understood and its advantages will become more apparent when the following detailed description is read with reference to the accompanying drawings wherein.

DETAILED DESCRIPTION

Figure 1:
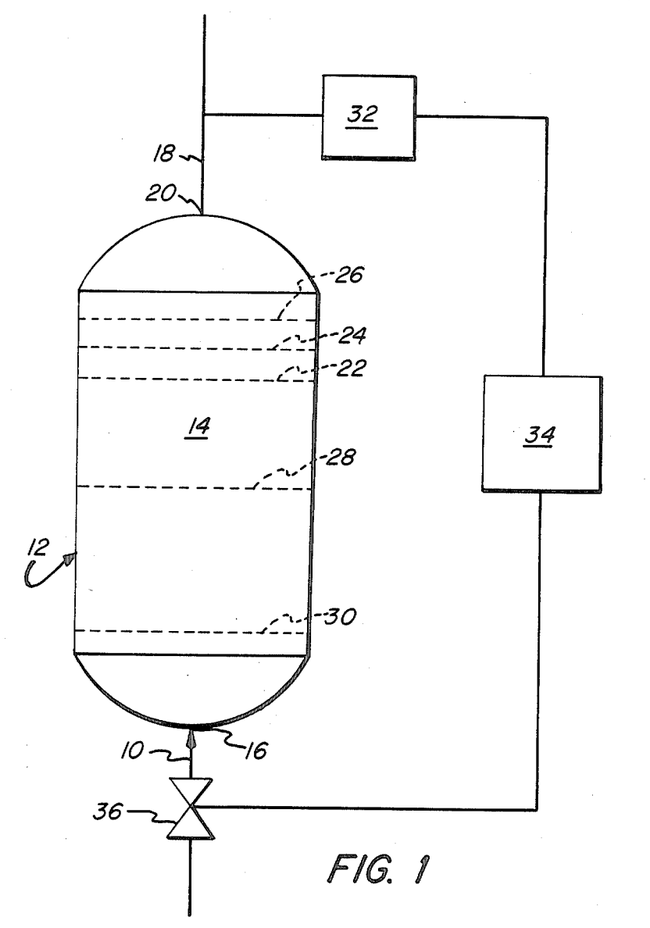
FIG. 1 is a schematic of a single adsorption bed system showing representative adsorbed gas loading at various stages of a single cycle of operation.

The pressure swing adsorption process is an essentially adiabatic process for separating a multicomponent fluid containing at least one selectively-adsorbable component. FIG. 1 shows feed fluid stream 10 comprising an admixture of impurity and product fluids, entering adsorption zone 12 containing a bed 14 of adsorbent material capable of selectively adsorbing the impurity from the feed fluid stream.

The term "impurity" denotes the component or components which are more-strongly adsorbed in the process. Thus the material described as impurity is not limited to a common definition of the term which denotes something unwanted and to be discarded. The term "product" denotes the less-strongly adsorbed fluid in the feed fluid stream and does not necessarily mean that this component is the desired component to which the process is directed.

The bed, because of the packing of the adsorbent material, contains non-selective voids. The feed fluid stream is introduced and contacted with the bed at an inlet end 16 of the adsorption zone at a first elevated pressure, thereby adsorbing the impurity in the adsorbent material and trapping part of the product fluid in the voids. An impurity-depleted product fluid 18 is discharged from the opposite end 20 of the adsorption zone.

As feed to the bed progresses, an impurity adsorption front is established at the inlet end of the adsorption zone and progressively moves longitudinally through the adsorption zone toward the discharge end to the predetermined level 22 within the zone. The introduction of the feed fluid is then terminated.

The product fluid trapped in the voids is then removed through the discharge end 20 of the adsorption zone by cocurrently depressurizing the adsorption zone from the first elevated pressure to a lower but still elevated pressure. This cocurrent depressurization causes the impurity adsorption front to advance toward the discharge end of the bed to a new level 26. Preferably, one or more intermediate steps of pressure equalization are comprised in cocurrent depressurization to bring the front to level 24, with the final stage of cocurrent depressurization advancing the front to level 26. In multibed systems the cocurrent depressurization stage provides purge gas to a bed undergoing regeneration. Thus, this step can be termed a provide purge step and is so referred to in FIG. 4.

According to the invention, a characteristic of the effluent from said cocurrent depressurization is sensed; and corrective action is taken responsive to the sensed characteristic. The corrective action will be any action effective to vary the impurity concentration in the product gas in the direction necessary to obtain desired product purity. Among those corrective actions which may be taken to force the actual impurity level in the cocurrent depressurization gas to the target level are the following: (1) adjusting the adsorption step time or other variable to control the impurity loading of each adsorbent bed; (2) adjusting the cocurrent depressurization termination pressure to control the impurity breakthrough at the product end of each adsorbent bed; and/or (3) adjusting the amount of purging gas received by each adsorbent bed to control the extent of regeneration. Other actions may also be effectively employed.

The invention enables automatic adjustment of internal operating parameters of a PSA unit to maintain product purity under changing operating conditions, such as variation in feed composition. A physical characteristic of the cocurrent depressurization effluent is measured, and controlled through cycle time and/or other adjustments to a target value. The target value is determined such that the desired product impurity level is achieved. Any physical characteristic of the effluent which is related to its purity, e.g., density, level of impurity, thermal conductivity or product component purity can be measured. The preferred characteristic is concentration of impurity.

It is an advantage of the invention that corrective action can be taken before the undesired event has occurred. By recognizing that unacceptable impurity breakthrough, or other measured physical characteristic, appears first in the cocurrent depressurization effluent, especially near the end of the stage, and will be of greater magnitude than the desired product impurity level, it is possible according to the invention to control product impurity level based upon analysis of the cocurrent depressurization gas.

The target impurity, or other physical characteristic, level in the cocurrent depressurization gas is always of greater magnitude than the desired product impurity level. A typical ratio of gas:product gas impurity concentration is approximately 10:1 for hydrogen PSA systems producing 99+ mol percent purity. However, this ratio will vary depending on the type of cycle, feed conditions, product purity, and the like, and is extremely difficult to predict under certain conditions, such as varying feed composition. Therefore, after the target impurity level or other physical characteristic in the cocurrent depressurization gas is reached within a defined tolerance, the product gas impurity level is preferably measured. If the product gas impurity level is not at the desired value, the difference between the actual and desired product impurity level is used to calculate a new target value for the impurity level in the cocurrent depressurization gas. The larger the difference, the larger the change in the target value.

This type of cascade control eliminates the need for a priori determination of the target value, and accommodates changes in the correct ratio of the impurity levels in the cocurrent depressurization gas and product gas resulting from changes in feed composition or other system parameters.

Referring again to FIG. 1, means 32 for sensing a physical characteristic of fluid flowing through line 18 is suitably positioned to sample the fluid in line 18. Also provided are means 34 for taking corrective action responsive to the sensed characteristic which performs the necessary control comparisons, calculations, and actions. In an exemplary situation the sensor is a gas analyzer, such as an infared analyzer, which can measure the concentration of a carbon monoxide impurity in a hydrogen-rich stream. In the illustrated single bed system, a single analyzer can be used for both cocurrent depressurization effluent and final product; it will be recognized, however, that certain systems may require at least separate sensors for each.

As a first step in the control sequence, the means 32 senses the level of carbon monoxide in the effluent from the cocurrent depressurization step. This sensed value is then processed by means 34, such as a process computer or programmable controller, operated by suitable software including a control algorithm. Means 34 then directs corrective action responsive to the sensed characteristic. For example, feed valve 36 may be timed to close earlier or later during the next adsorption stage. The action will be effective to vary the impurity concentration in the cocurrent depressurization gas in the direction necessary to obtain desired target impurity level. Preferably, after this level has been achieved within a defined tolerance, the purity of the product gas is also sensed by means 32 and means 34 then directs corrective action, which will typically involve changing the target value for cocurrent depressurization effluent impurity.

Figure 2:
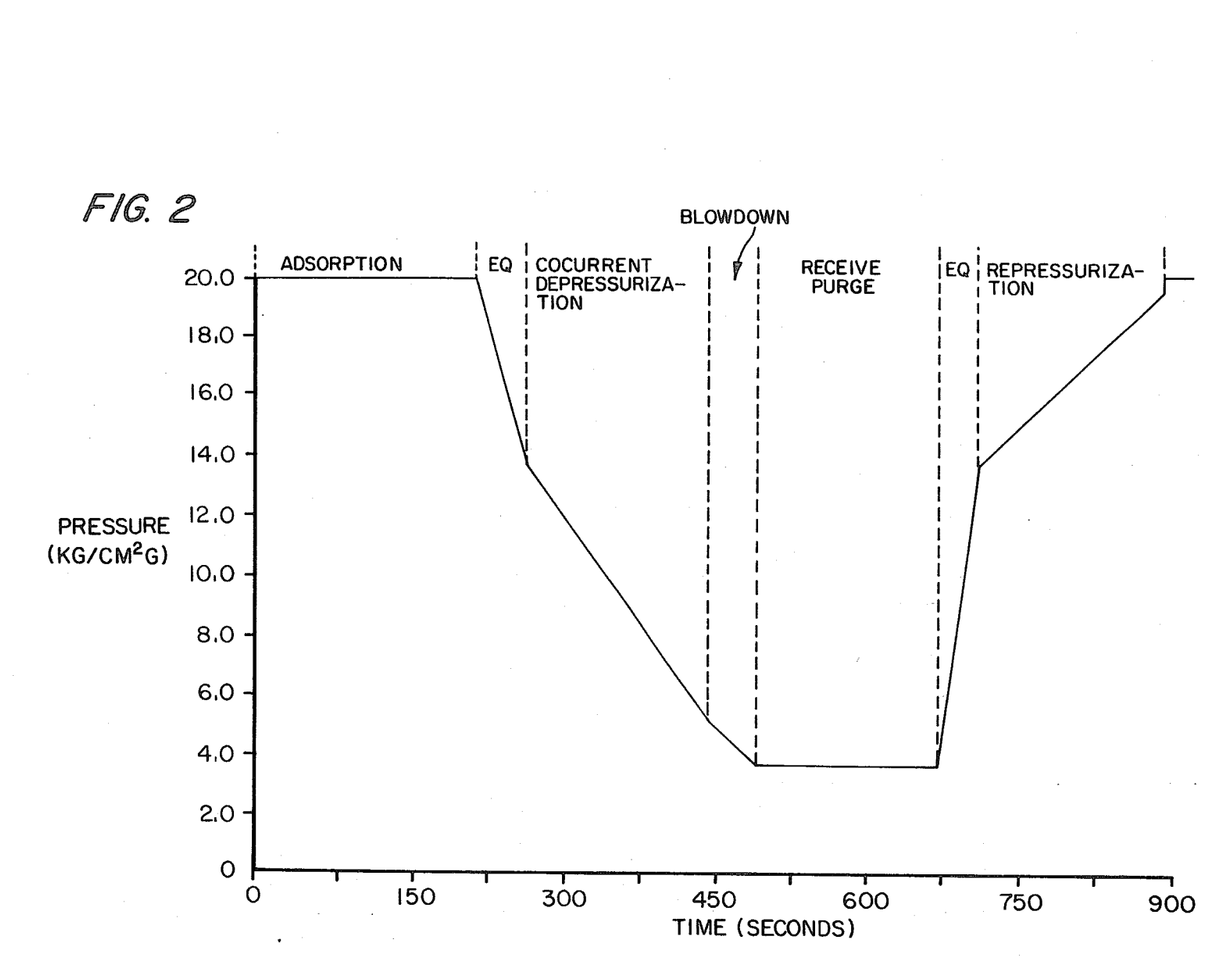
FIG. 2 is a graph showing a pressure profile of a single adsorption bed system for a single cycle of operation.

Following cocurrent depressurization, the adsorption zone is desorbed countercurrently to the direction of feed by further decreasing the pressure in the bed and withdrawing desorbed gas at 16. This step brings the front to level 28. Finally, the bed is cocurrent depressurization effluent from another bed, or purged with pure product, to bring the front to level 30. Representative stage times for a single bed and associated pressures for each stage are shown in FIG. 2.

EXAMPLE

Figure 3:
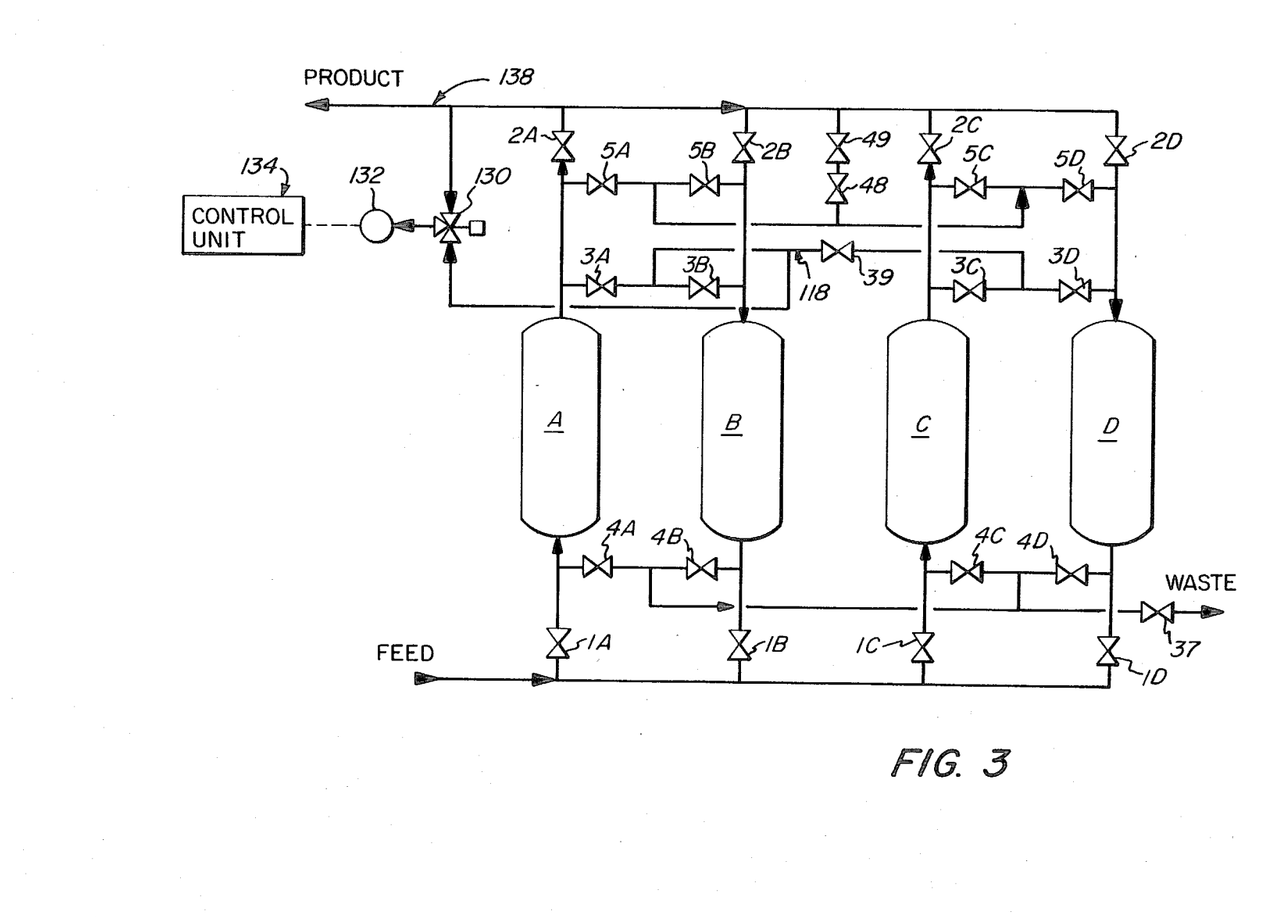
FIG. 3 is a schematic showing a four-bed PSA system.

This Example describes the operation of a four-bed pressure adsorption system as shown in FIG. 3 for purification of a hydrogen-rich gas stream from a steam reformer (typically, on a molar basis, 75% hydrogen, 4% methane, 3% carbon monoxide, 0.5% nitrogen, with the balance being carbon dioxide, and being saturated with water) to produce 99+ mole percent hydrogen, with minimal, e.g., less than 10 parts per million, concentration of carbon monoxide. Each of the four beds will have a lower layer of activated carbon and an upper layer of zeolite and undergoes each of the noted stages through a complete cycle. The invention is, however, applicable to other multibed systems and can be employed also where the more-strongly adsorbed gas is the product gas.

Figure 4:
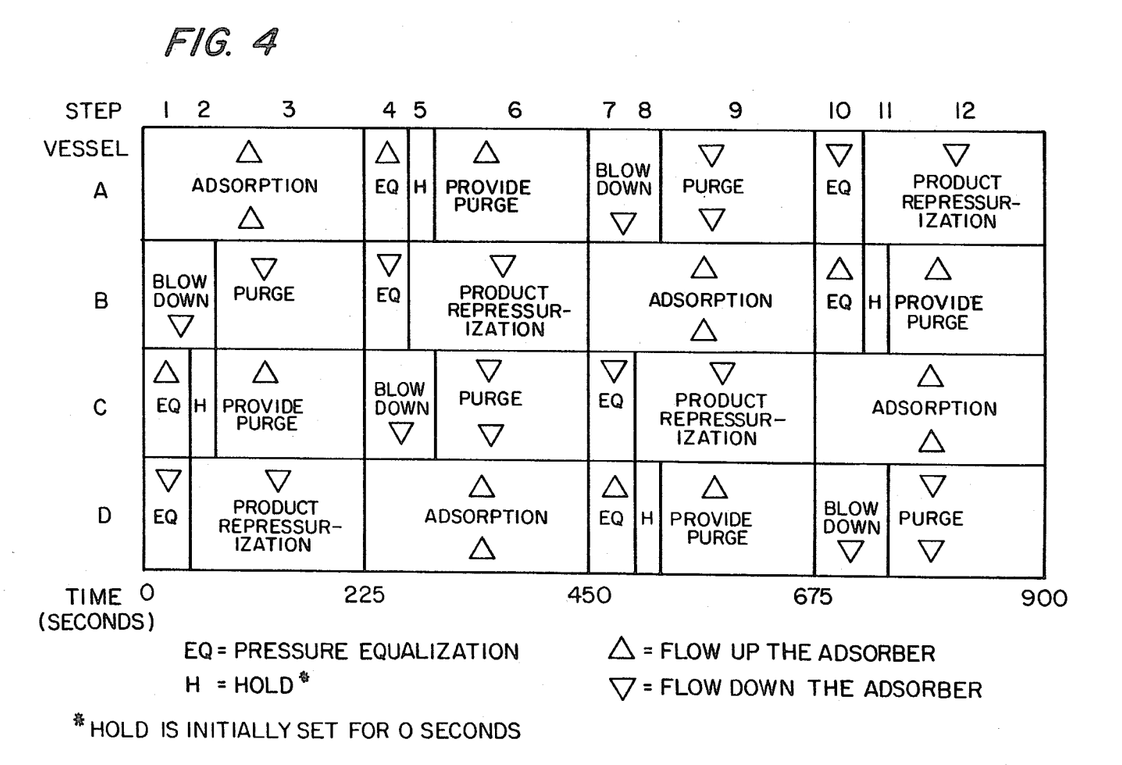
FIG. 4 is a chart showing a representative sequencing of a four-bed PSA system through a complete cycle of operation.

FIG. 4 is a chart showing the direction of flow within each of the beds shown in FIG. 3 during each of the stages of the cycle and the sequencing of all of the beds through one complete cycle of adsorption and regeneration.

FIG. 4 is based on a 15-minute cycle time. Cycle time is defined as the time that is required for all four adsorbers to go through a complete cycle of adsorption and regeneration. FIG. 4 describes in detail the twelve time periods that each adsorber goes through during one complete cycle. A single process step may cover several time periods. The arrows showing in FIG. 4 show the direction of flow for the first time period. Flow from this pattern will change as the time periods advance as described below. The graph in FIG. 2 shows representative pressures versus time for each step in the cycle for a single adsorber. In the following description, unless the valves are indicated as being open, they are closed.

Time Period 1:
(a) Simultaneously, valves 1A and 2A open to begin adsorption in adsorber A while valves 1C and 2C close to stop adsorption in adsorber C.
(b) Valves 5C and 5D open to begin equalization from adsorber C to adsorber D. During pressure equalization, the adsorber is depressurized cocurrently through valve 5C to an intermediate pressure. The gas released flows directly to adsorber D undergoing repressurization (see FIGS. 3 and 4) to provide gas for partial repressurization of that adsorber. The impurity front advances during this step, e.g., to a degree represented as level 24 in FIG. 1. During the repressurization stage, the adsorber is repressurized to adsorption pressure in two stages:
  (1) Pressure equalization and product gas enter the top of the adsorber through valve 5 of the adsorber being repressurized as described in (b) above; and
  (2) After the pressure equalization is completed, repressurization is continued with product gas only through valve 5 of the adsorber which is being repressurized. The final portion of repressurization occurs as the vessel switches to the adsorption step.
(c) Part of the product flow is diverted through valves 49, 48, and 5D for product repressurization of adsorber D.
(d) Valves 4B and 37 open to begin the countercurrent depressurization (blowdown) step of adsorber B. During blowdown, the adsorber is depressurized out of the bottom of the vessel (countercurrently) through valves 4B and 37 to waste stream pressure. Impurities are desorbed and vented, and the impurity front drops, say proportional to level 28 in FIG. 1.

Time Period 2:
(a) Adsorber A continues adsorption.
(b) Adsorber B continues blowdown.
(c) Valve 5C closes, ending equalization between adsorbers C and D. Adsorber C remains in a hold condition through the rest of the step.
(d) Adsorber D continues product repressurization.

Time Period 3:
(a) Adsorber A continues adsorption.
(b) Adsorber D continues product repressurization.

(c) Adsorber B is purged by the effluent from the last stage of cocurrent depressurization of adsorber C. Adsorber C provides essentially clean hydrogen gas (e.g., 30-100 ppm) through valves 3C, 39, and 3B. The clean hydrogen gas purges adsorber B and flows out, together with desorbed impurities, through valves 4B and 37. The purge stops when the termination pressure for cocurrent depressurization is reached. See FIG. 2 for example. During this stage the impurity front advances towards the top of the depressurizing adsorber (e.g., level 26 in FIG. 1).

(e) During time period 3, sensing means 132 receives cocurrent depressurization gas from manifold 118 through 3-way valve 130. The impurity level is measured and transmitted to control unit 134. Control unit 134 calculates the difference between the measured impurity level and a target impurity level. If the difference is greater than a predetermined tolerance, e.g, 5%, a new cycle time is calculated and effected by control unit 134, by changing time periods. The control unit effects larger changes to the time periods when there is a larger difference between the measured and target impurity levels and smaller changes when there is a smaller difference. By way of example, a 15% difference might result in a 5% change in cycle time.

If the difference between the measured and target impurity level in the cocurrent depressurization gas is within the predetermined tolerance, the product impurity level is measured in time period 4.

Time Period 4:

(a) Simultaneously, valves 1D and 2D open to begin adsorption in adsorber D while valves 1A and 2A close to stop adsorption in adsorber A.

(b) Valves 5A and 5B open to begin equalization from adsorber A to adsorber B.

(c) Part of the product flow is diverted through valves 49, 48, and 5B for product repressurization of adsorber B.

(d) Valve 4C and 37 open to begin blowdown of adsorber C.

(e) During time period 4, if the difference between the measured and target impurity levels in the cocurrent depressurization gas in time period 3 was within the predetermined tolerance, the product impurity level is measured. Sensing means 132 receives product gas from manifold 138 through 3-way valve 130. The measured impurity level is transmitted to control unit 134, which calculates the difference between the measured product impurity level and the maximum acceptable product impurity level. If the difference is greater than a predetermined tolerance, e.g., 3%, the target value for the impurity level in the cocurrent depressurization gas is changed. By way of example, a 3% difference might change the target level by 10%. This new target level would be used in time period 6.

Time Period 5:

(a) Adsorber D continues adsorption.

(b) Adsorber C continues blowdown.

(c) Valve 5A closes ending equalization between adsorbers A and B. Adsorber A remains in a hold condition through the rest of the step.

(d) Adsorber B continues product repressurization.

Time Period 6:

(a) Adsorber D continues adsorption.

(b) Adsorber B continues product repressurization.

(c) Adsorber C is purged by the effluent from cocurrent depressurization of adsorber A. Adsorber A provides clean hydrogen gas through valves 3A, 39, and 3C. The clean hydrogen gas purges adsorber C and flows out through valves 4C and 37.

(d) Adsorber A provides purge gas until the pressure drops to the cocurrent termination pressure.

(e) During time period 6, sensing means 132 receives cocurrent depressurization gas from manifold 118 through 3-way valve 130. The signal is transmitted to control unit 134 which performs the functions described in time period 3.

Time Period 7:

(a) Simultaneously, valves 1B and 2B open to begin adsorption in adsorber B while valves 1D and 2D close to stop adsorption in adsorber D.

(b) Valves 5C and 5D open to begin equalization from adsorber D to adsorber C.

(c) Part of the product flow is diverted through valves 49, 48, and 5C for product repressurization of adsorber C.

(d) Valves 4A and 37 open to begin the blowdown step of adsorber A.

(e) During time period 7, if the difference between the measured and target impurity is within the predetermined tolerance, the product impurity level is measured. Sensing means 132 receives product gas through 3-way valve 130. The measured impurity level is transmitted to control unit 134, which performs the functions described in time period 4.

Time Period 8:

(a) Adsorber B continues adsorption.

(b) Adsorber A continues blowdown.

(c) Valve 5D closes ending equalization between adsorbers D and C. Adsorber D remains in a hold condition through the rest of the step.

(d) Adsorber C continues product repressurization.

Time Period 9:

(a) Adsorber B continues adsorption.

(b) Adsorber C continues product depressurization.

(c) Adsorber A is purged by adsorber D. Adsorber D provides clean hydrogen gas through valves 3D, 39, and 3A. The clean hydrogen gas purges adsorber A and flows out through valves 4A and 37.

(d) Adsorber D provides purge gas until the pressure drops to the cocurrent termination pressure.

(e) During time period 9, sensing means 132 receives cocurrent depressurization gas from 3-way transmitted to control unit 134 which performs the functions described in time period 3.

Time Period 10:

(a) Simultaneously, valves 1C and 2C open to begin adsorption in adsorber C while valves 1B and 2B close to stop adsorption in adsorber B.

(b) Valves 5A and 5B open to begin equalization from adsorber B to adsorber A.

(c) Part of the product flow is diverted through valves 49, 48, and 5A for product repressurization of adsorber A.

(d) Valves 4D and 37 open to begin the blowdown step of adsorber D.

(e) During time period 10, if the difference between the measured and target impurity is within the predetermined tolerance, the product impurity level is measured. Sensing means 132 receives product gas through 3-way valve 130. The measured impurity level is transmitted to control unit 134, which performs the functions described in time period 4.

Time Period 11:

(a) Adsorber C continues adsorption.

(b) Adsorber D continues blowdown.

(c) Valve 5B closes ending equalization between adsorbers B and A. Adsorber B remains in a hold condition through the rest of the step.

(d) Adsorber A continues product repressurization.

Time Period 12:

(a) Adsorber C continues adsorption.

(b) Adsorber A continues product pressurization.

(c) Adsorber D is purged by adsorber B. Adsorber B provides clean hydrogen gas through valves 3B, 39, and 3D. The clean hydrogen gas purges adsorber D and flows out through valves 4D and 37.

(d) Adsorber B provides purge gas until the pressure drops to the cocurrent termination pressure. At the end of time period 12, the system returns to time period 1 and the cycle is repeated.

(e) During time period 12, sensing means 132 receives cocurrent depressurization gas from manifold 118 through 3-way valve 130. The signal is transmitted to control unit 134 which performs the functions described in time period 3.

This process can be performed with any suitable adsorbent, such as zeolitic molecular sieves, activated carbon, silica gel, activated alumina, and the like, as set forth in the above-referenced Kiyonaga patent, having a selectivity for the impurity over the product fluid.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention which is defined by the following claims.

We claim:

1. A process for controlling the level of impurity in a gas product stream from a pressure swing adsorption process including a cocurrent depressurization step, comprising:

sensing a characteristic of the effluent from said cocurrent depressurization step; and taking a corrective action responsive to the sensed characteristic, said action being effective to vary the impurity concentration in the product gas in the direction necessary to obtain desired product purity.

2. A process according to claim 1 wherein the physical characteristic measured is the concentration of impurity in said effluent.

3. A process according to claim 1 wherein said corrective action comprises varying the feed rate.

4. A process according to claim 1 wherein said corrective action comprises varying the duration of the adsorption step.

5. A process according to claim 1 wherein said corrective action comprises varying the termination pressure of the cocurrent depressurization step.

6. A process according to claim 1 including the further step of: sensing the level of impurity in the product gas stream; comparing the sensed level of impurity in the product gas stream to a reference value; and establishing a target value for the sensed value of the cocurrent depressurization effluent in response to the comparison of the sensed level of impurity in the product gas stream to the reference value.

7. A process for controlling the level of impurity in a gas product stream from a pressure swing adsorption process including a cocurrent depressurization step, comprising:

sensing a characteristic of the effluent from said cocurrent depressurization step;

taking a corrective action responsive to the sensed characteristic, said action being effective to vary the impurity concentration in the product gas in the direction necessary to obtain desired product purity;

sensing a physical characteristic of the product gas stream;

comparing the sensed physical characteristic of the product gas stream to a reference value; and establishing a target value for the sensed characteristic of the cocurrent depressurization effluent in response to the comparison of the sensed value of impurity in the product gas stream to the reference value.

8. A process according to claim 7 wherein the physical characteristic sensed is the concentration of impurity in said effluent.

9. A process according to claim 8 wherein said corrective action comprises varying the duration of the adsorption step.

10. A process according to claim 8 wherein said corrective action comprises varying the termination pressure of the cocurrent depressurization step.

11. An apparatus for controlling the level of impurity in a gas product stream from a pressure swing adsorption process including a cocurrent depressurization step, comprising:

means for sensing a characteristic of the effluent from said cocurrent depressurization step; and means for taking a corrective action responsive to the sensed characteristic, said action being effective to vary the impurity concentration in the product gas in the direction necessary to obtain desired product purity.

12. An apparatus according to claim 11 wherein the physical characteristic measured is the concentration of impurity in said effluent.

13. An apparatus according to claim 11 wherein said corrective action comprises varying the feed rate.

14. An apparatus according to claim 11 wherein said corrective action comprises varying the duration of the adsorption step.

15. An apparatus according to claim 11 wherein said corrective action comprises varying thg termination pressure of the cocurrent depressurization step.

16. An apparatus according to claim 11 further including: means for sensing the level of impurity in the product gas stream; means for comparing the sensed level of impurity in the product gas stream to a reference value; and means for establishing a target value for the sensed value of the cocurrent depressurization effluent in response to the comparison of the sensed level of impurity in the product gas stream to the reference value.

17. An apparatus for controlling the level of impurity in a gas product stream from a pressure swing adsorption process including a cocurrent depressurization step, comprising:

means for sensing a characteristic of the effluent from said cocurrent depressurization step;

means for taking a corrective action responsive to the sensed characteristic, said action being effective to vary the impurity concentration in the product gas in the direction necessary to obtain desired product purity;

means for sensing a physical characteristic of the product gas stream;

means for comparing the sensed physical characteristic of the product gas stream to a reference value; and means for establishing a target value for the sensed characteristic of the cocurrent depressurization effluent in response to the comparison of the sensed value of impurity in the product gas stream to the reference value.

18. An apparatus according to claim 17 wherein the physical characteristic sensed is the concentration of impurity in said effluent.

19. An apparatus according to claim 18 wherein said corrective action comprises varying the duration of the adsorption step.

20. An apparatus according to claim 18 wherein said corrective action comprises varying the termination pressure of the cocurrent depressurization step.

* * * * *

UNITED STATES PATENT AND TRADEMARK OFFICE
CERTIFICATE OF CORRECTION

PATENT NO. : 4,693,730
DATED : September 15, 1987
INVENTOR(S) : Geoffrey Q. Miller; Robert L. Gray, Jr.

It is certified that error appears in the above-identified patent and that said Letters Patent is hereby corrected as shown below:

Column 8, line 45, "3-way" should read --manifold 118 through 3-way valve 130. The signal is--.

Signed and Sealed this

Fourth Day of October, 1988

Attest:

DONALD J. QUIGG

Attesting Officer

Commissioner of Patents and Trademarks